(12) United States Patent
Kohnke

(10) Patent No.: US 8,663,732 B2
(45) Date of Patent: Mar. 4, 2014

(54) LIGHT SCATTERING INORGANIC SUBSTRATES USING MONOLAYERS

(75) Inventor: Glenn Eric Kohnke, Corning, NY (US)

(73) Assignee: Corsam Technologies LLC, Corning, NY (US)

( * ) Notice: Subject to any disclaimer, the term of this patent is extended or adjusted under 35 U.S.C. 154(b) by 331 days.

(21) Appl. No.: 13/033,175

(22) Filed: Feb. 23, 2011

(65) Prior Publication Data

US 2011/0209753 A1    Sep. 1, 2011

Related U.S. Application Data

(60) Provisional application No. 61/308,594, filed on Feb. 26, 2010.

(51) Int. Cl.
*B05D 1/12* (2006.01)
*B05D 1/36* (2006.01)

(52) U.S. Cl.
USPC .................. 427/163.4; 427/202; 427/204

(58) Field of Classification Search
USPC ........................................ 427/163.4, 202, 204
See application file for complete search history.

(56) References Cited

U.S. PATENT DOCUMENTS

| | | | | |
|---|---|---|---|---|
| 3,005,382 | A | 10/1961 | Weber | 88/82 |
| 3,222,204 | A | 12/1965 | Weber | 117/27 |
| 3,405,025 | A * | 10/1968 | Goldman | 428/142 |
| 4,265,937 | A * | 5/1981 | Kameya et al. | 427/163.4 |
| 4,377,723 | A | 3/1983 | Dalal | 136/249 |
| 4,497,974 | A | 2/1985 | Deckman et al. | 136/259 |
| 4,500,743 | A | 2/1985 | Hayashi et al. | 136/258 |
| 4,514,582 | A | 4/1985 | Tiedje et al. | 136/256 |
| 4,644,091 | A | 2/1987 | Hayashi et al. | 136/259 |
| 5,964,962 | A | 10/1999 | Sannomiya et al. | 136/256 |
| 6,420,647 | B1 | 7/2002 | Ji et al. | 136/259 |
| 6,538,195 | B1 | 3/2003 | Shi et al. | 136/259 |
| 6,750,394 | B2 | 6/2004 | Yamamoto et al. | 136/258 |
| 6,997,018 | B2 | 2/2006 | Sakoske et al. | 65/60.2 |
| 7,179,527 | B2 | 2/2007 | Sato et al. | 428/333 |
| 7,517,552 | B2 | 4/2009 | Ji et al. | 427/74 |
| 2002/0114883 | A1 * | 8/2002 | Mushett et al. | 427/163.4 |
| 2005/0029613 | A1 | 2/2005 | Fujisawa et al. | 257/436 |
| 2007/0110961 | A1 * | 5/2007 | Fensel et al. | 428/143 |

(Continued)

FOREIGN PATENT DOCUMENTS

| | | | | |
|---|---|---|---|---|
| EP | 2133924 | | 12/2009 | H01L 31/04 |
| WO | WO02/081390 | | 10/2002 | C03B 18/12 |

(Continued)

OTHER PUBLICATIONS

PCT International Search Report and Written Opinion of the International Searching Authority, International Application No. PCT/US2011/026004, International Filing Date Feb. 24, 2011, Priority Date Feb. 26, 2010.

*Primary Examiner* — Frederick Parker
(74) *Attorney, Agent, or Firm* — Harness, Dickey & Pierce, PLC

(57) ABSTRACT

Light scattering inorganic substrates comprising monolayers and methods for making light scattering inorganic substrates comprising monolayers useful for, for example, photovoltaic cells are described herein. The method comprises providing an inorganic substrate comprising at least one surface, applying an adhesive to the at least one surface of the inorganic substrate, applying inorganic particles to the adhesive to form a coated substrate, and heating the coated substrate to form the light scattering inorganic substrate.

22 Claims, 2 Drawing Sheets

(56) References Cited

U.S. PATENT DOCUMENTS

| | | |
|---|---|---|
| 2007/0116913 A1 | 5/2007 | Kimura et al. .................. 428/38 |
| 2007/0151596 A1 | 7/2007 | Nasuno et al. ................. 136/256 |
| 2008/0308146 A1 | 12/2008 | Krasnov et al. ............... 136/256 |

FOREIGN PATENT DOCUMENTS

| | | | |
|---|---|---|---|
| WO | WO03/019676 | 3/2003 | ............. H01L 31/18 |
| WO | WO2004/035496 A2 | 4/2004 | |
| WO | WO2004/035496 A3 | 4/2004 | ............. C03C 23/00 |
| WO | WO2007/110482 A1 | 10/2007 | ............. C04B 41/86 |
| WO | WO2009/002648 A2 | 12/2008 | ............. G01R 33/20 |
| WO | 2009/120344 | * 3/2009 | |
| WO | WO2009/120344 A2 | 10/2009 | ............... B05D 1/18 |
| WO | WO2009/120344 A3 | 10/2009 | ............... B05D 1/20 |
| WO | WO2010/072862 | 7/2010 | ......... H01L 31/0236 |
| WO | 2010/090142 | 8/2010 | ............. H01L 31/04 |
| WO | 2010/129462 | 11/2010 | ............. C03C 17/23 |
| WO | WO2010/016468 A1 | 11/2010 | ............... H01B 5/14 |

* cited by examiner 10 microns 10 microns ary to light
LIGHT SCATTERING INORGANIC SUBSTRATES USING MONOLAYERS This application claims the benefit of priority to U.S. Provisional Application No. 61/308,594 filed on Feb. 26, 2010.

BACKGROUND

1. Field

Embodiments relate generally to articles such as light scattering inorganic substrates and methods for making light scattering inorganic substrates, and more particularly to light scattering inorganic substrates comprising monolayers and methods for making light scattering inorganic substrates comprising monolayers useful for, for example, photovoltaic cells.

2. Technical Background

For thin-film silicon photovoltaic solar cells, light must be effectively coupled into the silicon layer and subsequently trapped in the layer to provide sufficient path length for light absorption. A path length greater than the thickness of the silicon is especially advantageous at longer wavelengths where the silicon absorption length is typically tens to hundreds of microns. Light is typically incident from the side of the deposition substrate such that the substrate becomes a superstrate in the cell configuration. A typical tandem cell incorporating both amorphous and microcrystalline silicon typically has a substrate having a transparent electrode deposited thereon, a top cell of amorphous silicon, a bottom cell of microcrystalline silicon, and a back contact or counter electrode.

Amorphous silicon absorbs primarily in the visible portion of the spectrum below 700 nanometers (nm) while microcrystalline silicon absorbs similarly to bulk crystalline silicon with a gradual reduction in absorption extending to ~1200 nm. Both types of material benefit from textured surfaces. Depending on the size scale of the texture, the texture performs light trapping and/or reduces Fresnel loss at the Si/substrate interface.

The transparent electrode (also known as transparent conductive oxide, TCO) is typically a film of fluorine doped-$SnO_2$ or boron or aluminum doped-ZnO with a thickness on the order of 1 micron that is textured to scatter light into the amorphous Si and the microcrystalline Si. The primary measure of scattering is called "haze" and is defined as the ratio of light that is scattered >2.5 degrees out of a beam of light going into a sample and the total light transmitted through the sample. The scattering distribution function is not captured by this single parameter and large angle scattering is more beneficial for enhanced path length in the silicon compared with narrow angle scattering. Additional work on different types of scattering functions indicate that improved large angle scattering has a significant impact on cell performance.

The TCO surface is textured by various techniques. For $SnO_2$, the texture is controlled by the parameters of the chemical vapor deposition (CVD) process used to deposit the films. An example of a textured $SnO_2$ film is, for example, Asahi-U films produced by Asahi Glass Company. For ZnO, plasma treatment or wet etching is used to create the desired morphology after deposition.

Disadvantages with textured TCO technology can include one or more of the following: 1) texture roughness degrades the quality of the deposited silicon and creates electrical shorts such that the overall performance of the solar cell is degraded; 2) texture optimization is limited both by the textures available from the deposition or etching process and the decrease in transmission associated with a thicker TCO layer; and 3) plasma treatment or wet etching to create texture adds cost in the case of ZnO.

Another approach to the light-trapping needs for thin film silicon solar cells is texturing of the substrate beneath the TCO and/or the silicon prior to silicon deposition, rather than texture a deposited film. In some conventional thin film silicon solar cells, vias are used instead of a TCO to make contacts at the bottom of the Si that is in contact with the substrate. The texturing in some conventional thin film silicon solar cells consist of $SiO_2$ particles in a binder matrix deposited on a planar glass substrate. This type of texturing is typically done using a sol-gel type process where the particles are suspended in liquid, the substrate is drawn through the liquid, and subsequently sintered. The beads remain spherical in shape and are held in place by the sintered gel.

Many additional methods have been explored for creating a textured surface prior to TCO deposition. These methods include sandblasting, polystyrene microsphere deposition and etching, and chemical etching. These methods related to textured surfaces can be limited in terms of the types of surface textures that can be created.

Light trapping is also beneficial for bulk crystalline Si solar cells having a Si thickness less than about 100 microns. At this thickness, there is insufficient thickness to effectively absorb all the solar radiation in a single or double pass (with a reflecting back contact). Therefore, cover glasses with large scale geometric structures have been developed to enhance the light trapping. For example, an EVA (ethyl-vinyl acetate) encapsulant material is located between the cover glass and the silicon. An example of such cover glasses are the Albarino® family of products from Saint-Gobain Glass. A rolling process is typically used to form this large-scale structure.

Disadvantages with the textured glass superstrate approach can include one or more of the following: 1) sol-gel chemistry and associated processing is required to provide binding of glass microspheres to the substrate; 2) the process creates textured surfaces on both sides of the glass substrate; 3) additional costs associated with silica microspheres and sol-gel materials; and 4) problems of film adhesion and/or creation of cracks in the silicon film.

For traffic safety, 3M manufacturers a wide range of products that incorporate retroreflector technology. One technology type is glass beads which are mirrored on the backside. To process these in large quantities, they form a monolayer of glass beads on an adhesive layer. The beads are typically on the order of tens of microns in size. The early patents on this technology suggest that the process of forming a monolayer using adhesive works for sizes of a few microns up to about 125 microns. In addition, oleophobic coatings are applied to the glass beads to control the amount they sink into the adhesive coating.

It would be advantageous to have a method for making a light scattering inorganic substrate wherein a monolayer of particles could be formed on the substrate. Further, it would be advantageous for the coating method to be adaptable for large substrates and adaptable to a continuous coating process.

SUMMARY

Articles such as light scattering inorganic substrates and/or methods for making a light scattering inorganic substrate, as described herein, address one or more of the above-mentioned disadvantages of conventional methods and may provide one or more of the following advantages: the glass microstructure coated with TCO may be smoothly varying and less likely to create electrical problems, the glass texture may be optimized without concern of an absorption penalty unlike in the case of a textured TCO more texture requires regions of thicker TCO resulting in higher absorption, the process does not require a binder that can be sintered as in the case of sol-gel processes, and the texture feature size may be controlled with the particle size distribution.

One embodiment is a method for making a light scattering inorganic substrate. The method comprises providing an inorganic substrate comprising at least one surface, applying an adhesive to the at least one surface of the inorganic substrate, applying inorganic particles to the adhesive to form a coated substrate, and heating the coated substrate to form the light scattering inorganic substrate.

Another embodiment is an article comprising an inorganic substrate having two opposing surfaces; and inorganic features disposed on at least one of the opposing surfaces, wherein at least a portion of the features have lateral feature sizes in the range of from 0.1 to 20 microns, and reentrant features less than 90 degrees. In one embodiment a majority of the features have lateral feature sizes in the range of from 0.1 to 20 microns, and reentrant features less than 90 degrees. The lateral feature size is, according to one embodiment, 20 µm or less, for example, 0.1 µm to 20 µm, for example, 0.5 µm to 20 µm, for example, 1 µm to 20 µm, for example, 1 µm to 15 µm, for example, 1 µm to 10 µm, for example, 1 µm to 5 µm, or, for example, 2 µm to 8 µm. The size of the particles is, according to one embodiment, 0.1 µm or greater, for example, 0.1 µm to 20 µm, for example, 0.1 µm to 10 µm or, for example, 10 µm to 20 µm, for example, greater than 10 µm to 20 µm, for example, 11 µm to 20 µm.

In one embodiment, the described articles comprise the inorganic features, for example, the inorganic particles disposed in a monolayer. The articles can be light scattering inorganic substrates and can be used in thin film photovoltaic solar cells.

Advantages of this monolayer deposition process are: the adhesive may be sprayed on or rolled on over a large area enabling a fast and simple process relative to self-assembly techniques, the process is capable of being run continuously without cutting the glass sheet prior to particle deposition, and the process may not require surface functionalization of the particles.

Embodiments herein describe light scattering glass substrates formed by depositing a monolayer of glass microspheres or glass microparticles followed by heating to fuse the monolayer to the substrate. The monolayer is created by depositing more than a monolayer of particles onto an adhesive-coated substrate and removing the excess particles. The light scattering inorganic substrates can be used in thin film photovoltaic solar cells.

Additional features and advantages of the invention will be set forth in the detailed description which follows, and in part will be readily apparent to those skilled in the art from the description or recognized by practicing the invention as described in the written description and claims hereof, as well as the appended drawings.

It is to be understood that both the foregoing general description and the following detailed description are merely exemplary of the invention, and are intended to provide an overview or framework for understanding the nature and character of the invention as it is claimed.

The accompanying drawings are included to provide a further understanding of the invention, and are incorporated in and constitute a part of this specification. The drawings illustrate one or more embodiment(s) of the invention and together with the description serve to explain the principles and operation of the invention.

BRIEF DESCRIPTION OF THE DRAWINGS

The invention can be understood from the following detailed description either alone or together with the accompanying drawing figures.

DETAILED DESCRIPTION

Figure 1A:
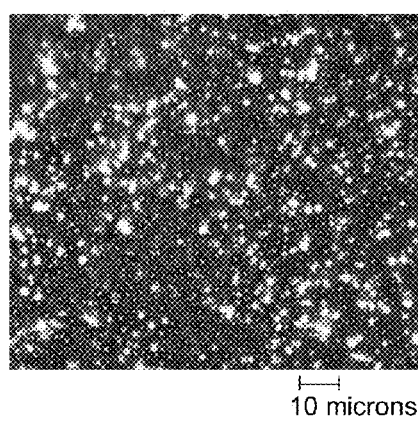
FIG. 1A shows a top down view 1000× microscope image of the monolayer coating prior to heating.

Reference will now be made in detail to various embodiments of the invention, examples of which are illustrated in the accompanying drawings. Wherever possible, the same reference numbers will be used throughout the drawings to refer to the same or like parts.

As used herein, the term "substrate" can be used to describe either a substrate or a superstrate depending on the configuration of the photovoltaic cell. For example, the substrate is a superstrate, if when assembled into a photovoltaic cell, it is on the light incident side of a photovoltaic cell. The superstrate can provide protection for the photovoltaic materials from impact and environmental degradation while allowing transmission of the appropriate wavelengths of the solar spectrum. Further, multiple photovoltaic cells can be arranged into a photovoltaic module.

As used herein, the term "adjacent" can be defined as being in close proximity. Adjacent structures may or may not be in physical contact with each other. Adjacent structures can have other layers and/or structures disposed between them.

One embodiment is a method for making a light scattering inorganic substrate. The method comprises providing an inorganic substrate comprising at least one surface, applying an adhesive to the at least one surface of the inorganic substrate, applying inorganic particles to the adhesive to form a coated substrate, and heating the coated substrate to form the light scattering inorganic substrate.

In one embodiment, applying the particles comprises pressing the particles onto the adhesive on the surface of the inorganic substrate.

In another embodiment, applying the particles comprises pressing the adhesive coated inorganic substrate onto the inorganic particles. In one embodiment, applying the particles comprises electrostatically depositing the particles. Electrostatic deposition of particles is known in the art of deposition and is commonly used in the fabrication of abrasive papers. The paper is coated with an adhesive followed by the electrostatic deposition of particles onto the adhesive which is then cured for the final product. A similar electrostatic deposition process can be used to deposit the particles in the present invention and may offer the advantage of not having to remove excess particles.

In one embodiment, applying the adhesive comprises spraying, rolling, dipping, wiping, or combinations thereof.

The method, according to one embodiment, further comprises removing excess particles prior to heating.

In one embodiment, the substrate is heated. The heating temperature can be adjusted depending on the softening temperatures of either the substrate, the particles, or both.

In one embodiment, low softening temperature particles can be deposited on a high softening temperature substrate. In another embodiment, high softening temperature particles can be deposited on a low softening temperature substrate. In one embodiment, the softening temperatures of the particles and the substrate are the same. Depending on the combination of materials for the particles and the substrate and the heating temperature, either the particles, substrate, or both can be heated. In one embodiment, the substrate is softened and the particles can move into the softened substrate or be pressed into the softened substrate. According to some embodiments, the heating temperature is in the range of from 600° C. to 900° C.

Figure 4:
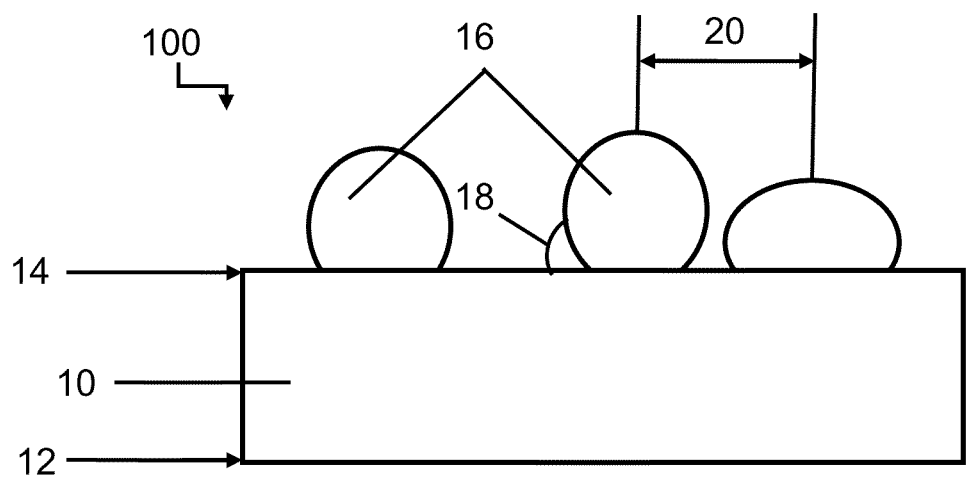
FIG. 4 is a cross-sectional illustration of an article, according to one embodiment.

Another embodiment is an article 100, as shown in FIG. 4, inorganic substrate 10 having two opposing surfaces 12 and 14; and inorganic features 16 disposed on at least one of the opposing surfaces, for example, surface 14 wherein at least a portion of the features have lateral feature sizes in the range of from 0.1 to 20 microns, as shown by arrow 20 and reentrant features less than 90 degrees, as shown by angle 18. In one embodiment a majority of the features have lateral feature sizes in the range of from 0.1 to 20 microns, and reentrant features less than 90 degrees.

The articles can be light scattering inorganic substrates and can be used in thin film photovoltaic solar cells.

In one embodiment, the material of the inorganic features has a softening point less than the softening point of material of the inorganic substrate by 50 degrees Celsius or more, for example, by 75 degrees Celsius or more, for example, by 100 degrees Celsius or more, for example, by 150 degrees Celsius or more, for example, by 175 degrees Celsius or more, for example, by 200 degrees Celsius or more.

The inorganic substrate, in one embodiment, comprises a material selected from a glass, a ceramic, a glass ceramic, sapphire, silicon carbide, a semiconductor, and combinations thereof. The glass can be, for example, silica, borosilicate, soda-lime, aluminaborosilicate, or combinations thereof. The inorganic substrate can be in the form of a sheet. The sheet can have substantially parallel opposing surfaces. In some embodiments, the inorganic substrate has a thickness of 4.0 mm or less, for example, 3.5 mm or less, for example, 3.2 mm or less, for example, 3.0 mm or less, for example, 2.5 mm or less, for example, 2.0 mm or less, for example, 1.9 mm or less, for example, 1.8 mm or less, for example, 1.5 mm or less, for example, 1.1 mm or less, for example, 0.5 mm to 2.0 mm, for example, 0.5 mm to 1.1 mm, for example, 0.7 mm to 1.1 mm. In one embodiment, the inorganic substrate is in the form of a sheet and has a thickness in the describe range.

In one embodiment, the inorganic particles comprise spheres, microspheres, bodies, symmetrical particles, non-symmetrical particles, or combinations thereof.

In one embodiment, the inorganic features, for example, inorganic particles can be of any shape or geometric shape, for example, polygonal. The inorganic features, for example, the inorganic particles can comprise a material selected from a glass, a ceramic, a glass ceramic, sapphire, silicon carbide, a semiconductor, silica, alumina, zirconia, glass frit, a metal oxide, a mixed metal oxide, zinc oxide, borosilicate, and combinations thereof.

Generally, any size structures that are generally used by those of skill in the art can be utilized herein. In one embodiment, the structures have diameters of 20 micrometers ($\mu m$) or less, for example, in the range of from 100 nanometers (nm) to 20 $\mu m$, for example, in the range of from 100 nanometers (nm) to 10 $\mu m$, for example, fpm to 10 $\mu m$ can be coated using methods disclosed herein.

In one embodiment, the structures have a distribution of sizes, such as diameter. The diameter dispersion of structures is the range of diameters of the structures. Structures can have monodisperse diameters, polydisperse diameters, or a combination thereof. Structures that have a monodisperse diameter have substantially the same diameter. Structures that have polydisperse diameters have a range of diameters distributed in a continuous manner about an average diameter. Generally, an average size of polydisperse structures is reported as the particle size. Such structures will have diameters that fall within a range of values. Using different sized particles to make the light scattering inorganic substrates may lead to enhanced light scattering properties at different wavelengths.

One embodiment is a photovoltaic device comprising the light scattering inorganic substrate made according to the methods disclosed herein. The photovoltaic device, according to one embodiment further comprises a conductive material adjacent to the substrate, and an active photovoltaic medium adjacent to the conductive material.

The active photovoltaic medium, according to one embodiment, is in physical contact with the conductive material. The conductive material, according to one embodiment is a transparent conductive film, for example, a transparent conductive oxide (TCO). The transparent conductive film can comprise a textured surface.

The photovoltaic device, in one embodiment, further comprises a counter electrode in physical contact with the active photovoltaic medium and located on an opposite surface of the active photovoltaic medium as the conductive material.

In one embodiment, a light scattering inorganic substrate is created having a textured surface that is suitable for subsequent deposition of a TCO and thin film silicon photovoltaic device structure. In one embodiment, the structure is formed by deposition of glass microparticles or microspheres onto an adhesive coated glass substrate followed by heating with or without pressing of the particles.

The first step is to deposit an adhesive on a substrate. The adhesive may be applied in a variety of ways. For demonstration purposes, transfer adhesives have been most effective. In practice, it is more likely that a spray coating or rolling process would be used. The next step is to attach the glass particles to the substrate. This may be done by pressing the adhesive-coated substrate onto a surface containing the particles or by sprinkling particles onto the adhesive-coated substrate and pressing them. The excess particles are then brushed off leaving behind only the monolayer that is attached to the adhesive layer. The sample is then heated to attach the particles to the underlying substrate. During the heating process, the thin layer of adhesive is burned off.

This process is applicable to a broad range of particles and substrates and, as with the fluid-forming self assembly, is not limited to glass. The heating conditions can be optimized for each material system and the type of surface structure that is desired. This process addresses the problem of the slow time required to form a monolayer by self-assembly techniques as well as any potential scaling problems associated with those techniques. While simple methods of adhesive deposition are used for lab-scale demonstration, large-scale spray coating or roller coating systems may be used. 3M currently fabricates reflective sheeting material using an adhesive process in sizes as large as 4 feet wide.

EXAMPLES

Figure 1B:
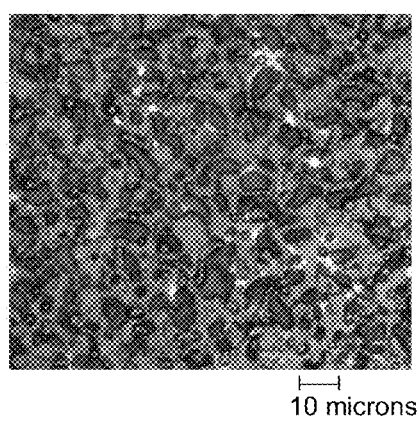
FIG. 1B shows a top down view 1000× microscope image of a light scattering inorganic substrate, according to one embodiment, after heating at 790° C. for 60 minutes.

This process was successfully demonstrated with both large soda lime particles (d50=9.4 $\mu m$) on soda lime substrates and with small borosilicate particles (d50=1.816 μm) on EagleXG™ substrates. For the soda lime particles, the adhesive was a glue stick that was simply applied to the substrate and smoothed with a gloved finger. For the borosilicate particles, both the glue stick approach and a transfer adhesive approach were demonstrated. The experimental details of the transfer adhesive approach using borosilicate particles is described here. The borosilicate particles are microspheres from Potters Industries (product code EMB10) and subsequently filtered to reduce the size distribution. The transfer adhesive in this example is a commercially available adhesive from 3M, 3M 9447 adhesive. Using a transfer adhesive commercially available from Adhesives Research, Inc., part number 92132, significantly reduced particle clumping. In this example, the glass substrate was coated with the adhesive. The adhesive coated substrate was then pressed into glass particles spread on a surface. The excess particles were removed with a paint brush. FIG. 1A shows a 1000× microscope image of the monolayer coating prior to heating. FIG. 1B shows a 1000× microscope image of a light scattering inorganic substrate, according to one embodiment, after heating at 790° C. for 60 minutes. A ramp rate of 5° C./min was used in this experiment.

Figure 2A:
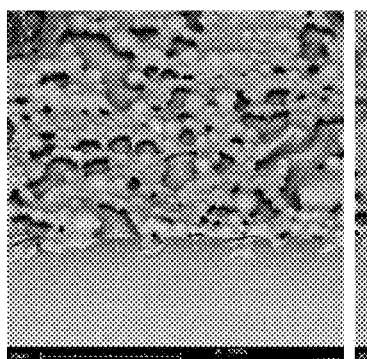
FIGS. 2A, 2B, and 2C are cross sectional scanning electron microscope (SEM) images of light scattering inorganic substrates heated at 770° C., 790° C., and 810° C., respectively, for 60 minutes.
Figure 2B:
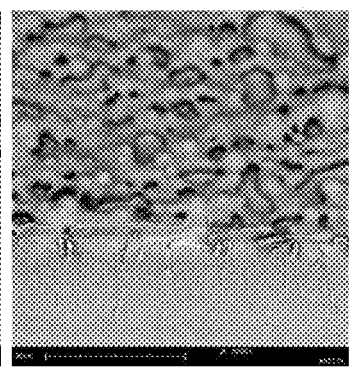
Figure 2C:
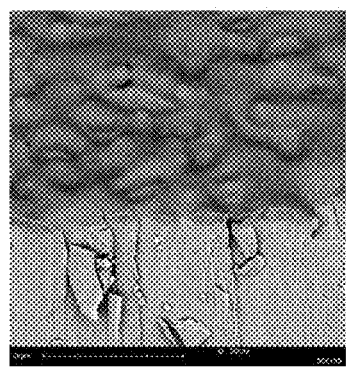
Figure 3:
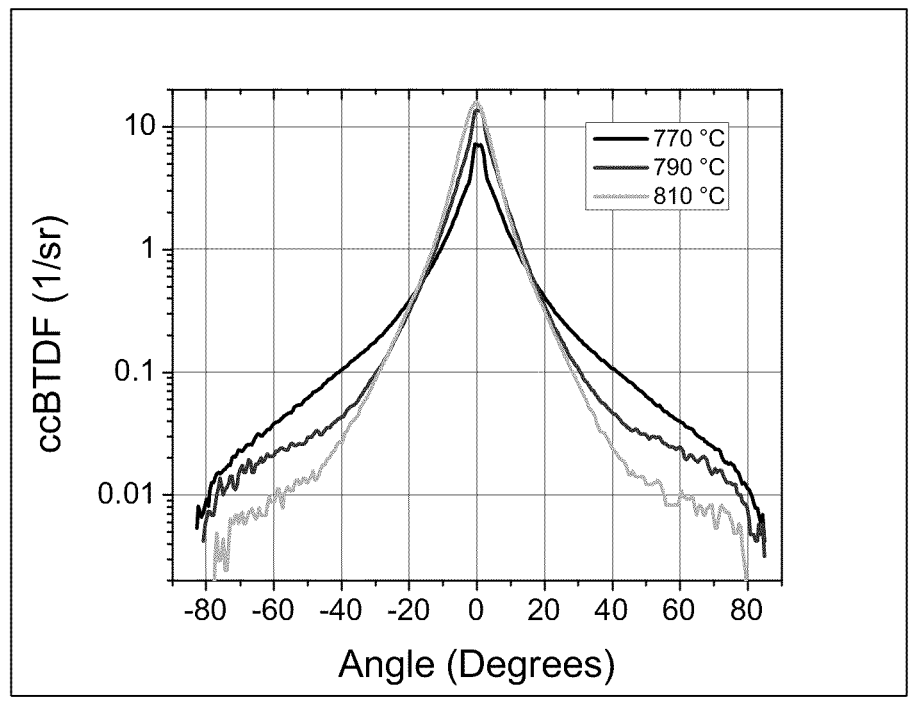
FIG. 3 is a plot of 1-D cross-sections of the ccBTDF measurements at 600 nm for different heating temperatures.

The resulting monolayer is somewhat more flowed out than the equivalent process done by fluid-forming self assembly. This suggests that the burned off adhesive layer is impacting the wetting of the glass particles to the surface. FIGS. 2A, 2B, and 2C are scanning electron microscope (SEM) images of light scattering inorganic substrates heated at 770° C., 790° C., and 810° C., respectively, for 60 minutes. The light scattering properties were characterized by measuring the cosine-corrected bidirectional transmittance function (ccBTDF) at 400 nm, 600 nm, 800 nm, and 1000 nm. No wavelength dependence was observed. The 1-D cross-sections of the ccBTDF measurements at 600 nm are shown in FIG. 3 for different heating temperatures. The performance of these samples is very similar to those made using fluid-forming self-assembly to form the monolayer. There is some issue with the uniformity of the adhesive layer that leads to localized clumping of particles. It is expected that this is related to the specific type of transfer adhesive used and can be overcome by a different material or different type of application method of the adhesive to the substrate.

What is claimed is:

1. A method for making a light scattering inorganic substrate, the method comprising:
   providing an inorganic substrate comprising at least one surface, wherein the substrate comprises a material selected from a glass, a ceramic, a glass ceramic, sapphire, silicon carbide, a semiconductor, and metal oxides;
   applying an adhesive to the at least one surface of the inorganic substrate;
   applying inorganic particles to the adhesive to form a coated substrate; and
   heating the coated substrate to form the light scattering inorganic substrate, wherein the adhesive burns off during the heating, and the heating attaches the inorganic particles to the inorganic substrate.

2. The method according to claim 1, wherein applying the particles comprises pressing the particles onto the adhesive on the surface of the inorganic substrate.

3. The method according to claim 1, wherein applying the particles comprises electrostatically depositing the particles.

4. The method according to claim 1, wherein applying the particles comprises pressing the adhesive coated inorganic substrate onto the inorganic particles.

5. The method according to claim 1, wherein applying the adhesive comprises spraying, rolling, dipping, wiping, or combinations thereof.

6. The method according to claim 1, further comprising removing excess particles prior to heating.

7. The method according to claim 1, wherein the inorganic particles are applied in a monolayer.

8. The method according to claim 1, wherein the heating is carried out at a temperature of 600° C. to 900° C.

9. The method according to claim 1, wherein the adhesive comprises a material selected from a glue, a transfer adhesive, a tape, and combinations thereof.

10. The method according to claim 1, wherein the inorganic particles comprise spheres, microspheres, symmetrical particles, nonsymmetrical particles, or combinations thereof.

11. The method according to claim 1, wherein the particles comprise a material selected from a glass, a ceramic, a glass ceramic, sapphire, silicon carbide, a semiconductor, and metal oxides.

12. The method according to claim 1, wherein the substrate comprises a glass and the particles comprise a glass.

13. The method according to claim 1, wherein the substrate comprises a glass and the particles comprise a borosilicate.

14. The method according to claim 1, wherein the substrate comprises a glass and the particles comprise a semiconductor.

15. The method according to claim 1, wherein the size of the particles is 0.1-20 microns.

16. The method according to claim 1, wherein the size of the particles is 0.1-10 microns.

17. The method according to claim 1, wherein the size of the particles is 10-20 microns.

18. The method according to claim 1, wherein the size of the particles is 11-20 microns.

19. The method according to claim 1, wherein the substrate has a thickness of 4 mm or less.

20. The method according to claim 1, wherein the substrate has a thickness of 0.5-2 mm.

21. The method according to claim 1, wherein the substrate has a thickness of 0.5-22.1 mm.

22. The method according to claim 1, wherein the substrate has a thickness of 0.7-1.1 mm.

* * * * *